UNITED STATES PATENT OFFICE.

JOHN COLLINS CLANCY, OF NIAGARA FALLS, NEW YORK, ASSIGNOR TO THE NITROGEN CORPORATION, OF PROVIDENCE, RHODE ISLAND, A CORPORATION OF RHODE ISLAND.

AMMONIA SYNTHESIS AND CATALYST THEREFOR.

1,352,178.     Specification of Letters Patent.     Patented Sept. 7, 1920.

No Drawing.     Application filed March 17, 1919. Serial No. 283,012.

*To all whom it may concern:*

Be it known that I, JOHN COLLINS CLANCY, a citizen of the United States, residing at Niagara Falls, in the county of Niagara and State of New York, have invented certain new and useful Improvements in Ammonia Synthesis and Catalysts Therefor, of which the following is a specification.

This invention relates to a process of synthesizing ammonia from its elements and to a catalyst or class of catalysts of extraordinary potency, by means of which free nitrogen may be copiously fixed in the form, for example, of ammonia.

The art to which the present invention relates has been and is the field of every earnest effort on the part of literally thousands of inventors and skilled workers and enormous sums of money have been expended by individuals and by governments in the hope that the problem of efficiently synthesizing ammonia from its elements, might be solved.

The word "efficiently" is used advisedly in this connection, since, as is well known, many substances and combinations of elements are capable of acting as mediocre or relatively poor catalysts, which if present in sufficient quantity, and afforded sufficient time, especially under enormous pressures, such as those approximating 200 atmospheres, are able to afford a moderate per cent. by volume of ammonia in the gaseous mixture leaving such catalysts.

What is referred to in the art as the "space-time-yield" of ammonia is hence the important factor and the essential problem from a commercial standpoint has been to find a catalyst which, with the gaseous mixture of $H_2$ and $N_2$ flowing thereover or therethrough, at a pressure which does not require almost prohibitively costly apparatus, is yet capable of affording a satisfactory space-time-yield.

The herein described invention has for its principal object the solution of this problem.

Incidental to the effectuation of the preferred mode of conducting the process herein described, other and more or less subsidiary objects have been held in view, such as the elimination of the need for excessive pressures, the use of desirably low temperatures, etc.

These and other objects of my invention will be hereinafter referred to and the novel combinations of steps in the process and of elements in the catalyst therefor, will be more particularly pointed out in the appended claims.

I will preface the description of the preferred embodiment of my invention with some reference to a series of discoveries which I have made, which bear directly thereupon, in order to bring out more clearly the advantages residing in said preferred embodiment.

The cyanamids, particularly those of the alkali and alkaline earth metals, some time since attracted my attention as possible catalysts for ammonia synthesis; but in experimenting and working with these, I was at times perplexed to explain discrepancies in results.

By way of illustration, when using calcium cyanamid as a catalyst, for the purpose in question, with the gaseous mixture of nitrogen and hydrogen in combining proportions and under a pressure of one hundred atmospheres, I, at times, obtained yields of two per cent. by volume of ammonia. At other times this yield was materially less, while, again, at others, somewhat more.

Investigation led to the discovery that the calcium cyanamid which is usually characterized and sold as such, is contaminated with more or less sulfur. Also, since it is usually produced in an electric furnace, it is a sintered product. I therefore sought to produce pure, sulfur-free calcium cyanamid as a non-sintered and preferably highly porous material. This, I accomplished in a variety of ways: For example, a solution of commercial calcium cyanamid in water may be treated with just sufficient silver nitrate to eliminate the sulfur. The solution when filtered off is one of pure $CaCN_2$. This is treated with $CO_2$ and after the calcium carbonate formed has been separated by filtration, the filtrate is evaporated to dryness under vacuum, to yield crystals of cyanamid, ($H_2CN_2$). I discovered that these crystals are soluble in liquid ammonia and to such a solution I add pure metallic calcium (which dissolves freely in liquid $NH_3$) in molecular proportions, to again form $CaCN_2$. The ammonia is then driven off at a low temperature.

The so produced calcium cyanamid is pure and exceedingly flocculent and porous. Its color is white, whereas commercial cyanamid, as usually produced at high temperatures, is black and dense.

When using this material as a catalyst for ammonia synthesis, operating at pressures such as that of the atmosphere or but moderately higher, and at, for example, 500° C., I was disconcerted to find that the catalyst did not then behave as a true one; since it dissociated with production of hydrocyanic acid gas together with ammonia. HCN is of course highly poisonous and the product was hence substantially useless for most purposes.

When used under the same conditions, the familiar calcium cyanamid of commerce, behaved similarly and this led to my discovery of the effect of high pressure upon this class of substances.

Substantially all of the alkali and alkaline earth metal cyanamids when heated to, for example, 500° C., in the presence of hydrogen or of mixed hydrogen and nitrogen gases, at atmospheric pressure or thereabout, yield hydrocyanic acid gas and otherwise become unsuited for use as efficient ammonia synthesizing catalysts. High pressures, such as 100 atmospheres, on the other hand, stabilize such catalysts, so that the above described flocculent, pure calcium cyanamid then becomes a good catalyst, capable of quite efficiently synthesizing ammonia from its elements, without contamination with hydrocyanic gas, while the ammonia yield, by volume, may reach, for example, 18% at but 100 atmospheres pressure and at from 425° to 450° C.

Again appeared an inconsistency, however, in that later when reviewing my work and again attempting to use this material as an ammonia synthesis catalyst, at atmospheric pressure, I found that, at times, a given quantity of the catalytic material, except initially, would not dissociate to yield cyanogen radicals or HCN, while at others it would. Upon further investigation I discovered that this phenomena depended upon the nature of the tube used as a container for the catalyst. When this tube was quite small in diameter and of iron, the formation of HCN soon ceased, while a long tube of large diameter, even if of iron, permitted long continued formation of hydrocyanic acid gas.

This led to the remarkable discovery that iron and, as I have since found, certain other metals, e. g.: manganese, cobalt, ruthenium, osmium, vanadium, columbium and tantalum, are capable of exerting a peculiar influence upon the alkali or alkaline earth metal cyanamids which are exposed to hydrogen under the described conditions. That is to say, when finely divided calcium cyanamid, for example, is intimately mixed with finely divided iron and used as a catalyst for ammonia synthesis at, for example, 450° C., and, be it remarked in view of the foregoing, at even atmospheric pressure,—the calcium cyanamid is not decomposed to yield HCN, but rather behaves as a splendid catalyst and at higher pressures yields ammonia copiously.

It is, of course, obviously impossible to state with absolute certainty just what takes place in the catalytic mass; but it seems not unreasonable that the principal reactions may be expressed by the following equations:

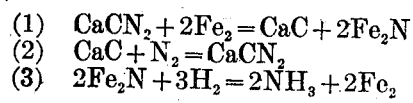

As per equation (1), the metallic iron deprives the calcium cyanamid of its nitrogen; apparently to form iron nitrid. This letter, at the temperature of the operation, is either unstable or not especially stable (depending upon the temperature which may range from about 400° to approximately 600° C.).

The bulk of the carbid of calcium formed is evidently not $CaC_2$, which normally forms at a higher temperature; but rather appears to be the sub-carbid. This sub-carbid readily combines with the free nitrogen of the gaseous mixture, at the temperatures in question, to reform calcium cyanamid.

The iron nitrid seemingly parts with its nitrogen in nascent condition directly to the hydrogen of the gaseous mixture, with resultant formation of metallic iron and reformation of metallic iron; although possibly some iron hydrid may be formed, the hydrogen of which then combines with the nitrogen freely supplied by the cyanamid, to form ammonia.

A feature of importance in the above, is that the iron, or its herein indicated equivalent, must be present in sufficient quantity, if the alkali or alkaline earth metal cyanamid present is to be fully utilized. A probable explanation for this appears upon consideration of the assumed reaction:

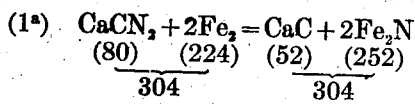

As is evident from this, 100 grams of $CaCN_2$ require 280 grams of iron to fulfil the equation, if the action takes place in the manner described.

The iron compound formed, whatever its nature, is in any case one which is unstable at the temperature at which it is formed, especially in the presence of the hot, chemically active hydrogen and the cyanamid or cyanamid residues; and it effects a continuous removal of fixed nitrogen from the cyanamid with resultant copious continuous formation of ammonia.

As the ammonia should preferably be formed below 600° C. (in fact I prefer to operate at a temperature even below 500° C.), the nitrogen-liberating metal, e. g., iron, must be one which is capable of breaking up the radical $CN_2$ to liberate the nitrogen from the carbon, and, moreover, it should preferably be one which does not form its nitrid above the operating temperature. Hence, titanium, for example, which according to the usual arrangement of the periodic table of the elements, is in the same horizontally arranged series (or "long period") as vanadium, manganese and iron, still is not well suited for use in my improved catalyst, at least in so far as ammonia synthesis is concerned; seemingly because it forms its nitrid at too high a temperature. Similarly, I do not regard nickel as a suitable metal of the type in question; this metal forming is nitrid at a temperature which is undesirably high. This nitrid-forming property of nickel appears to substantiate the working hypothesis disclosed by equations (1), (2) and (3); because nickel is generally regarded as a particularly active hydrogenating element or catalyst. That is to say, that because of the high temperature of formation of nickel nitrid, it is unsuitable for use in the present catalyst,—certainly as compared to iron. Actual working tests bear this out.

Cobalt, on the other hand, is available for use, although its nitrid forms and becomes unstable at a temperature somewhat above that of iron. This temperature is, however, not too high for successful ammonia synthesis.

Manganese is remarkably well adapted for the purpose in question, probably on account of its chemical activity and its ability to form a not-too-stable nitrid within the preferred range of temperatures.

While I have referred to calcium cyanimid as one of the preferred alkali or alkaline earth metal cyanamids, this has been done merely by way of illustration, as potassium, strontium, or barium cyanamid may be substituted therefor. Indeed these four cyanamids are very nearly equally efficacious; that of barium being slightly the best but that of calcium being cheapest. On the other hand, and unexpectedly, lithium cyanamid is not in a class, for the purpose in question, with any of the said four cyanamids; nor, indeed, is sodium cyanamid. I consider that the explanation for this, at least in part, is that the lithium and sodium cyanogen compounds are too stable at the temperature of the operation and refuse to freely part with their nitrogen to, or as a result of the action of, the liberating-metal.

Magnesium cyanamid, also, is not well adapted to the process.

It may be well to observe at this point that when a too-stable nitrid or cyanamid,— or a metal, such as titanium,—is present in the catalyst, it, of course, does not prevent the catalyst from working (unless it be a very poisonous metal), but rather behaves as a more or less inert diluent.

The carbo-nitrid forming non-alkalinous metals,—i. e., the metals of less positive character than the alkali and alkaline earth metals, which less positive metals are nevertheless capable of forming so-called carbo-nitrids,—are not available for use as the base or bases of the nitrogen-annexing part (e. g.—CaC) of the catalyst, since, seemingly, only metals of the alkali and alkaline earth metal groups can so function, at least efficiently, in conjunction with the nitrogen-liberating part thereof (e. g.—Fe). This is probably due to the peculiarly strong positive or chemically active character of the elements of the alkali and alkaline earth metal groups, which for brevity and to avoid circumlocution in the appended claims will be characterized generically herein as the "alkalinous" metals. As further illustrating the difference in principle of operation of the cyanamid of a strongly positive metal, such as $CaCN_2$, used alone (under pressure) as an ammonia synthesizing catalyst,—as compared to, for example, this same cyanamid when mixed, or acting in conjunction with, iron, manganese, or any one or more like "nitrogen-carriers", it is surprising to find that while the $CaCN_2$ when used alone, must not only be under high pressure to prevent formation of HCN; but, as above noted, it must, to be a reasonably efficient catalyst, be substantially pure, i. e., practically sulfur-free; while on the other hand, the sintered, sulfur-bearing calcium cyanamid of commerce, when ground and properly mixed with sufficient finely divided iron, for example,—becomes an excellent catalyst and, moreover, does not yield cyanogen radicals or HCN, at the operating temperature, even at atmospheric pressure; except possibly initially.

Apparently, what takes place in connection with the more or less poisonously acting sulfur, is that the iron, or the like, takes it up, and to the extent that a part of the nitrogen-carrier or liberator is thus burdened with sulfur, the efficiency of the catalyst is reduced. If sufficient iron, or its equivalent, be present, it can thus eliminate the harmful sulfur while still leaving a sufficient amount of active nitrogen-carrying material present, to efficiently co-act with the free-nitrogen fixing material.

Also, if some, but insufficient, nitrid-forming material (e. g., Mn, Fe, V, or the like), be present, or if such material be insufficiently in contact with the alkalinous cyanamid,—then in the absence of pressure sufficient to prevent the delivery of HCN to the gaseous current of mixed nitrogen and hydrogen, the $CaCN_2$, or the like, will dissociate with formation of HCN, until a point is reached where there is sufficient iron, or the like, present to preserve the remainder from further dissociation.

What seemingly occurs, when no metal, such as iron, is present, as a part of the catalyst, to affect the alkali or alkaline earth metal cyanamid,—is that hydrogen, at, for example, 450° C. is able to replace the $CN_2$ to form calcium hydrid, while more hydrogen then splits one atom of nitrogen from the $CN_2$ to yield both ammonia and the objectionable hydrocyanic acid.

(4) 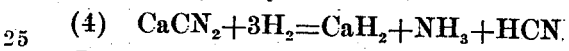

Just how and why pressure,—in the absence of such a metal as iron or the like,—is able to substantially prevent this objectionable liberation of gaseous HCN, I cannot state. I have discovered, however that it does.

On the other hand, in the absence of pressure, if sufficient iron or a like stabilizing metal is present.—then there is apparently a greater tendency for this metal to deprive the $CN_2$ of its entire content of nitrogen, probably as per equation (1), than there is for the hydrogen present to react upon the cyanamid as per equation (4); while, owing to this entire removal of nitrogen, alone, from the cyanamid, at the low temperature in question, there is at once left a carbid which is peculiarly well adapted to combine with free nitrogen, as per equation (2), and no nitrogen combined with carbon, is available for the formation of HCN.

There is, of course, the possibility that the theory of the reactions herein set forth may be partly in error; but in any event, it affords a working hypothesis which has enabled me to successfully prognosticate what elements are available for use as, virtually stabilizers (in the absence of pressure) for cyanamids which, otherwise, in the presence of hydrogen and at the reaction temperatures noted, would yield gaseous HCN; while in any case, it is certain that the presence of one or more of these stabilizing metals in sufficient quantity and properly associated with an alkalinous cyanamid not only liberates the fixed nitrogen of the latter from its undesirably intimate union with the carbon, which yields the cyanogen radicals which form HCN with hydrogen; but further, it renders the whole a particularly fine catalyst.

Thus, for example, when operating with a gaseous mixture of three parts by volume of hydrogen to one of nitrogen, at a temperature of 450° C., with one cubic inch of a catalytic mixture of calcium cyanamid mixed with iron and manganese, in the proportion of 50 parts of the cyanamid to 10 parts of iron and 10 of manganese, under a pressure of but ten atmospheres, I have obtained 2.3 per cent. by volume of ammonia in the gas leaving the catalyst; the rate of flow of the gaseous mixture being 3 liters per hour.

It is by no means essential that the materials of which the catalyst initially consists, shall comprise an alkali or alkaline earth metal cyanamid mixed with finely divided iron, or its equivalent; since, as suggested by equation (2), a suitable alkali or alkaline earth metal carbid, such as $CaC$, $BaC$, $K_2C$, or the like, may be mixed with either a metal, per se, such as manganese; or the nitrogen liberating metal may be initially embodied in a suitable compound of the same, such, by way of illustration, as a nitrid, e. g. $Fe_2N$, $Mn_2N$, etc.

A suitable carbid of calcium, for example, may be formed by dissolving metallic calcium in liquid ammonia and then bubbling up acetylene gas through the solution to form the desired carbid, at a very low temperature.

Again, I may start with, for example, solid calcium cyanid and mix this with the metallic nitrogen-carrier, or source of the same; in which case the cyanid will be converted into the cyanamid under the reaction conditions and the catalyst will thereafter function as per equations (1), (2), and (3); assuming, as seems necessary for purposes of description, that the indicated mode of operation of the catalyst is correct.

Calcium cyanid, if this be the cyanid selected, may be formed as follows:

Through a solution of pure metallic calcium in liquid ammonia, bubble hydrocyanic acid gas, to form $Ca(CN)_2$, which is precipitated as a flocculent white powder. The precipitate may be readily separated from the liquid ammonia by filtration, for example; and thereafter intimately mixed with finely divided iron or its equivalent. The iron may also be supplied from, for example, $Fe_2(FeCy_6)$, $Fe_3(FeCy_6)_2$, or $Fe_4(FeCy_6)_3$, etc.; or a mixture of nitrogen-carriers or conveyers may be introduced into or mixed with the other constituents, in the form of, for example, $Mn_2(FeCy_6)$, $Fe_4(CoCy_6)_3$, $MnFe(CoCy_6)$, etc.

The materials for the catalyst, whether initially in one form or another, as above indicated,—may very conveniently be briqueted; for example, in the following novel manner: Calcium cyanamid is ground to a very fine powder and mixed with its quota of iron, also in the finely divided state. This mixture is then treated with a 5% solution of potassium cyanid in liquid ammonia. The ammonia is then evaporated off to leave the calcium cyanamid, plus iron, in an agglomerated and highly porous condition. If desired, the agglomerate may be formed in molds to afford briquets of any desired shape and size. Such briquets behave as splendid catalytic bodies for the synthesis of ammonia from its elements, at, for example, 450°–500° C.

I may here note that the addition of iron or a like nitrogen-carrying element, or mixture of such elements to the alkali or alkaline earth metal-carbon compound, which sooner or later becomes a cyanamid, permits of effective operation at a somewhat lower temperature than is possible with pure calcium cyanamid (under pressure) alone, for example. Indeed, even at atmospheric pressure and at a temperature of 500° C., ammonia may be synthesized by the described intimate mixture of calcium cyanamid and iron or manganese, in reactive-ratio proportions (see equation 1$^a$); the yield being .25 volumes per cent.

The stabilizing or nitrogen-liberating material may, as above indicated, advantageously comprise a plurality of nitrid-forming metals, and it is possible that these metals may co-act to, in effect, supply a nitrogen-carrying chain; since the nitrid of cobalt, for example, forms at a somewhat higher temperature than that of iron or manganese, and at a given or determined temperature, one nitrogen-carrier may pick up nitrogen from the cyanamid more readily than another; while, at said temperature, said other may be better adapted to part with its nitrogen content to the hydrogen. In such case, the latter carrier would receive its nitrogen via the first mentioned carrier, which, in turn, would receive it directly from the cyanamid; or if another and intermediate carrier be present, then from this latter, which in turn receives its nitrogen from the cyanamid.

Iron, manganese and cobalt may, in this way, be advantageously mixed or associated with calcium cyanamid, for example; or even with a mixture of alkalinous cyanamids.

With respect to the calcium sub-carbid, or its equivalent ($K_2C$; BaC, etc.), present in the catalytic mass when the latter is in use,—the estimation of this substance is an exceedingly difficult matter. There is no literature upon this subject, of which I am aware; nor is there any light to guide one in the analysis of calcium subcarbid; the substance being hitherto unknown.

As a test, the catalytic mass, after use, may be removed from the autoclave or contact chamber, and is thereupon treated with water,—gas being evolved. A solution of ammoniacal copper chlorid may be used to separate acetylene from ethylene, and the evolved gas is hence passed through such a solution and is then analyzed. The analysis shows the absence of acetylene and presence of ethylene; proving that the carbid present in the reactive mass or catalyst, is one which yields ethylene. Calcium carbid ($CaC_2$) reacts with water to form acetylene, instead of ethylene and hence, indubitably, a carbid is present in the reactive mass which is other than the normal carbid. Other tests which I have made confirm this although there are indications that some normal carbid may at times also be present.

Finally, I particularly desire to emphasize the sharp difference between calcium cyanamid, used purely as a catalyst and under high pressure to preserve it as such,— and the same material used, under pressure or not, as desired, in combination with a stabilizing substance, such as manganese, vanadium, iron or the like; which combination results in a catalyst of a very different kind. In this combination the cyanamid seemingly becomes a novel carbid which of itself is not the catalyst *per se*, but rather constitutes the nitrogen annexing part of a complex catalyst; while the stabilizing material behaves as another part of said catalyst, its function being to break apart the nitrogen-carbon radicals formed by the first mentioned part, rather than to act, *per se*, as a nitrogen fixing medium.

This complex catalyst, since it may for convenience be styled a catalyst, therefore comprises substances and intermediate substances which are formed and reformed as the result of a repeating chain of mass reactions; while only the mass as a whole behaves as a catalyst.

Having thus described my invention, what I claim is:

1. The process of synthesizing ammonia which comprises forming a catalyst which includes a nitrid-forming metal, the nitrid of which is capable of reacting with hydrogen, at an ammonia-forming temperature, to yield ammonia vapor, said catalyst also including a combination of an alkalinous metal and carbon, which combination is capable, at said temperature, of fixing free nitrogen and thereafter, at the same temperature, of yielding said fixed nitrogen to said nitrid-forming metal, and reacting upon said catalyst at said temperature, with free nitrogen and hydrogen, to form ammonia.

2. The process of synthesizing ammonia which comprises forming a catalyst which includes a nitrid-forming metal, the nitrid of which is capable of reacting with hydrogen, at an ammonia-forming temperature, to yield ammonia vapor, said catalyst also, including a combination of an alkalinous metal and carbon, which combination is capable, at said temperature, of fixing free nitrogen and thereafter, at the same temperature, of yielding said fixed nitrogen to said nitrid-forming metal, and continuously reacting upon said catalyst at said temperature, with a mixture of free nitrogen and hydrogen, substantially in combining proportions, to continuously produce ammonia.

3. The process of synthesizing ammonia which comprises forming a complex catalyst which includes a nitrogen fixing component which at atmospheric pressure, when at the temperature of the synthesizing operation, in the presence of hydrogen, is unstable and gives rise to volatilizable products, said catalyst also including a nitrogen receiving component to prevent such dissipation of said substance, reacting upon said catalyst with a gaseous mixture of nitrogen and hydrogen in substantially combining proportions at a temperature such as to cause said first mentioned component of said catalyst to substantially continuously fix free nitrogen and immediately surrender it to said nitrogen receiving component, while simultaneously removing nitrogen from the latter by combining such nitrogen with hydrogen to form ammonia, at the same temperature.

4. The process of synthesizing ammonia which comprises forming a catalyst which includes a cyanamid of a strongly positive alkalinous metal intimately associated with a non-alkalinous metal capable of disrupting the bonds between the carbon and nitrogen of said cyanamid to favor the combination of such nitrogen with hydrogen in the form of ammonia, and reacting upon said catalyst with free nitrogen and hydrogen, at a temperature which favors a copious production of ammonia, to combine the hydrogen with the fixed nitrogen so yielded by the cyanamid, to produce ammonia, and to substantially simultaneously fix the free nitrogen in combination with said alkalinous metal and carbon, to reform said cyanamid.

5. The process of synthesizing ammonia which comprises forming a catalyst which includes a cyanamid of an alkalinous metal intimately associated with a plurality of metals capable, at a temperature at which ammonia can be copiously formed, of acting as liberators of nitrogen from the carbon of said cyanamid, the residue containing said alkalinous metal, after the removal of a part at least of the fixed nitrogen therefrom by a nitrogen-liberating metal at said temperature, being thereupon capable of combining with free nitrogen, and one or more of said nitrogen-liberating metals being adapted to yield nitrogen to hydrogen, to produce ammonia, and subjecting said catalyst to nitrogen and hydrogen at said temperature, to cause said catalyst to function substantially in manner aforesaid.

6. The process of synthesizing ammonia which comprises forming a catalyst which includes a cyanamid of an alkalinous metal intimately associated with a metal capable, at a temperature approximating 500° C., of acting as a conveyer of nitrogen from said cyanamid, the residue containing said alkalinous metal after the removal of a part at least of the fixed nitrogen therefrom by said nitrogen-conveyer, at said temperature, being thereupon capable of combining with free nitrogen, and said nitrogen-conveyer being adapted to yield the fixed nitrogen carried thereby, for combination with free hydrogen to form ammonia, and subjecting said catalyst to nitrogen and hydrogen at said temperature, to cause said catalyst to function substantially in manner aforesaid.

7. The process of producing ammonia which comprises reacting with free nitrogen upon a carbid of an alkalinous metal to form a cyanamid of said metal, reacting with a nitrid-forming metal upon said cyanamid to reform said carbid and to form a nitrid of said last mentioned metal, reacting with free hydrogen upon said nitrid to form ammonia and liberate said nitrid-forming metal, and cyclically repeating the reactions aforesaid.

8. The process of producing ammonia which comprises reacting with free nitrogen upon a carbid of an alkalinous metal to form a cyanamid of said metal, reacting with a nitrid-forming metal upon said cyanamid to reform said carbid and to form a nitrid of said last mentioned metal, reacting with free hydrogen upon said nitrid to form ammonia and liberate said nitrid-forming metal and cyclically repeating the reactions aforesaid while effecting all of said reactions substantially simultaneously and at the same temperature.

9. The process of producing ammonia which comprises reacting with free nitrogen upon a sub-carbid of an alkalinous metal to form a cyanamid of said metal, reacting with a nitrid-forming metal upon said cyanamid to reform said sub-carbid and to form a nitrid of said last mentioned metal, reacting with free hydrogen upon said nitrid to form ammonia and liberate said nitrid-forming metal and cyclically repeating the reactions aforesaid.

10. The process of producing ammonia which comprises forming a mixture which includes a metallic element, a nitrid of which is capable of reacting with hydrogen to form ammonia at a temperature below 600° C. and above 400° C., said mixture also including a carbonaceous compound of an alkalinous metal, the elements of which compound can combine unstably with nitrogen at said temperature, and reacting upon said mixture at said temperature with free nitrogen and hydrogen to catalytically combine said nitrogen and hydrogen in the form of ammonia through the intermediacy of said mixture.

11. The process of producing ammonia which comprises forming a mixture which includes a metallic element, a nitrid of which is capable of reacting with hydrogen to form ammonia at a temperature below 600° C. and above 400° C., said mixture also including a carbonaceous compound of an alkalinous metal, the elements of which compound can combine unstably with nitrogen at said temperature, and reacting upon said mixture at said temperature with free nitrogen and hydrogen under a pressure exceeding ten atmospheres, to catalytically combine said nitrogen and hydrogen in the form of ammonia through the intermediacy of said mixture.

12. The process of producing ammonia which comprises forming a mixture in which is present nitrogen-carrying material which includes one or more nitrid-forming metallic elements, a nitrid of at least one of which elements is capable at a determined temperature of reacting with hydrogen to form ammonia, said mixture also including carbonaceous material which comprises one or more alkalinous metal compounds the elements of at least one of which compounds can combine so unstably with nitrogen at said temperature as to tend,—at atmospheric pressure and at said temperature, especially in the presence of free hydrogen,—to part with carbon in combination with nitrogen, said metallic material tending to prevent such loss of carbon, by removing the nitrogen from the carbon combined therewith, and being present in said mixture in quantity sufficient to substantially prevent such loss even at atmospheric pressure,—and reacting upon said mixture with hydrogen and nitrogen to synthetically form ammonia.

13. The process of producing ammonia which comprises forming a catalyst in which is present alkalinous material which includes one or more alkalinous metallic elements, intimately associated with carbon and with one or more non-alkalinous elements which are capable of disrupting the bonds between carbon in said material and nitrogen fixed in the same, to permit combination of such nitrogen and hydrogen solely in the form of ammonia gas, said alkalinous material when thus deprived of its fixed nitrogen being capable of fixing free nitrogen at a temperature at which said ammonia may copiously form, and subjecting said catalyst to free nitrogen and hydrogen, at said temperature, to thus fix said nitrogen and combine said hydrogen therewith, substantially as described.

14. The process of producing ammonia which comprises reacting upon the sub-carbid of an alkalinous metal with nitrogen to form a cyanamid of said metal.

15. The process of producing ammonia which comprises reacting with a nitrid forming metal upon a cyanamid of an alkalinous metal to abstract nitrogen therefrom.

16. The process of producing ammonia which comprises reacting with a nitrid forming metal upon a cyanamid of an alkalinous metal to abstract nitrogen therefrom, and combining said abstracted nitrogen with hydrogen.

17. The process of producing ammonia which comprises alternately fixing free nitrogen in combination with—and removing said nitrogen, when thus fixed, from,—a sub-carbid of an alkalinous metal.

18. The process of producing ammonia which comprises as a feature thereof, reacting with free nitrogen upon a carbid of an alkalinous metal, one of the outstanding characteristics of which carbid is, that when it is treated with water it yields ethylene.

19. The process of producing ammonia which comprises reacting with free nitrogen and hydrogen upon a nitrogen-fixing catalyst which includes an alkalinous cyanamid having non-alkalinous metallic material intimately associated therewith in substantially reactive-ratio proportions, said non-alkalinous material being capable of stabilizing the carbon in said cyanamid to prevent its escape from the catalyst, together with nitrogen, when, at an ammonia synthesizing temperature, the pressure to which said catalyst is subjected approximates that of the atmosphere.

20. The process of synthesizing ammonia which comprises forming a catalyst which includes two substances which,—in the presence of each other and of free nitrogen and hydrogen, with exclusion of oxygen and at a temperature at which ammonia can be copiously formed,—are each capable of forming unstable nitrogen compounds, one of said substances being capable at said temperature of functioning as a nitrogen fixing medium and the other being capable, at said temperature, of acting as a nitrogen conveying medium, said last mentioned substance being adapted to receive from the first mentioned substance nitrogen which has been fixed by the latter substance, and to then deliver such nitrogen to free hydrogen, to form ammonia vapor, and subjecting said catalyst to a mixture of free nitrogen and hydrogen, at said temperature, to cause said substances to function in manner aforesaid.

21. A catalyst through the intermediacy of which ammonia may be synthesized from its elements, which comprises a carbonaceous nitrogen-annexing component and a metallic nitrogen-carrying component capable of removing nitrogen, fixed by said carbonaceous component, from the latter for combination with hydrogen.

22. A catalyst through the intermediacy of which ammonia may be synthesized from its elements, which comprises a carbonaceous nitrogen-annexing component and a metallic nitrogen-carrying component capable of removing nitrogen, fixed by said carbonaceous component, from the latter for combination with hydrogen, said carbonaceous component of said catalyst being capable of fixing free nitrogen and said nitrogen-carrying component being capable of removing said nitrogen from said carbonaceous component, both at the same temperature.

23. A catalytic organization through the intermediacy of which ammonia may be synthesized from its elements, which comprises a nitrogen-fixing substance, A, one of the elements of which becomes directly bonded to the nitrogen fixed thereby, said element being carbon, and a nitrogen-conveying substance, B, intimately associated with substance A, both of said substances being capable of efficiently performing their respective functions at the same temperature, and said substance B having less chemical affinity for the nitrogen carried thereby than has free hydrogen at said temperature, said substance B, further, having at said temperature a greater affinity for the nitrogen fixed by substance A than has the latter.

24. A catalytic organization through the intermediacy of which ammonia may be synthesized from its elements, which comprises a nitrogen-fixing substance, A, one of the elements of which becomes directly bonded to the nitrogen fixed thereby, said element being carbon, and a nitrogen-conveying substance, B, intimately associated with substance A, both of said substances being capable of efficiently performing their respective functions at the same temperature, and said substance B having less chemical affinity for the nitrogen carried thereby than has free hydrogen at said temperature, said substance B, further, having at said temperature a greater affinity for the nitrogen fixed by substance A than has any element of said substance A, including said carbon, substance B being present in sufficient quantity to, in effect, stabilize substance A by overcoming the tendency for radicals, formed by the union of said carbon with nitrogen, to separate from the remainder of substance A at said temperature.

25. A catalyst through the intermediacy of which ammonia may be synthesized from its elements, which comprises a carbon compound, the carbon of which is capable of directly uniting with free nitrogen at a temperature which renders the so-formed carbo-nitrogenous compound unstable in the presence of gaseous hydrogen, said last mentioned compound, when at atmospheric pressure, tending to part with its carbon in combination with hydrogen and the fixed nitrogen, and an auxiliary substance, the presence of which tends to prevent the escape of carbon from said catalyst by removing the nitrogen from said carbon.

26. A catalyst through the intermediacy of which ammonia may be synthesized from its elements, which comprises an alkalinous metal carbon compound, the carbon of which is capable of directly uniting with free nitrogen at a temperature which renders the so-formed carbo-nitrogenous compound unstable in the presence of gaseous hydrogen, said last mentioned compound, when at atmospheric pressure, tending to part with its carbon in combination with hydrogen and the fixed nitrogen, and an auxiliary substance, the presence of which tends to prevent the escape of carbon from said catalyst by removing the nitrogen from said carbon.

27. A catalyst through the intermediacy of which ammonia may be synthesized from its elements, which comprises a carbon compound, the carbon of which is capable of directly uniting with free nitrogen at a temperature which renders the so-formed carbo-nitrogenous compound unstable in the presence of gaseous hydrogen, said last mentioned compound, when at atmospheric pressure, tending to part with its carbon in combination with hydrogen and the fixed nitrogen, and an auxiliary substance which comprises a metal, the presence of which tends to prevent the escape of carbon from said catalyst by removing the nitrogen from said carbon.

28. A catalyst through the intermediacy of which ammonia may be synthesized from its elements, which comprises a carbon compound, the carbon of which is capable of directly uniting with free nitrogen at a temperature which renders the so-formed carbo-nitrogenous compound unstable in the presence of gaseous hydrogen, said last mentioned compound, when at atmospheric pressure, tending to part with its carbon in combination with hydrogen and the fixed nitrogen, and an auxiliary substance which comprises a nitrid-forming metal, the presence of which tends to prevent the escape of carbon from said catalyst by removing the nitrogen from said carbon.

29. A catalyst through the intermediacy of which ammonia may be synthesized from its elements, which comprises an alkalinous metal, intimately associated with carbon and with a plurality of metallic elements, the presence of which prevents the escape of said carbon from said catalyst in combination with nitrogen fixed by said catalyst.

30. A catalyst through the intermediacy of which ammonia may be synthesized from its elements, which comprises an alkalinous metal, intimately associated with carbon, manganese, and iron.

In testimony whereof I have affixed my signature, in the presence of two witnesses.

JOHN COLLINS CLANCY.

Witnesses:
H. H. HACKENHINNER,
FRANCES G. SMITH.